Patented Mar. 10, 1936

2,033,820

UNITED STATES PATENT OFFICE 2,033,820

MANUFACTURE OF CELLULOSE DERIVATIVES

Henry Dreyfus, London, England

No Drawing. Application January 25, 1933, Serial No. 653,471. In Great Britain February 12, 1932

9 Claims. (Cl. 260—101)

This invention relates to the manufacture of new organic compounds and in particular new cellulose derivatives having substantially improved properties as compared with previous cellulose derivatives of a like type.

It is well known that cellulose tri-acetate, which may be produced for example by esterification of cellulose with the aid of acetic anhydride in presence of zinc chloride or sulphuric acid as catalyst, is insoluble in the most important commercial solvents, and is in fact only soluble in chloroform, tetrachlorethane or similar solvents which are difficultly useable in practice. In order to produce a cellulose acetate which is soluble in the organic solvents which are commercially useable, for example acetone, it is necessary to treat the chloroform-soluble cellulose acetate in order to change its solubility characteristics, and in particular to obtain the acetone-soluble cellulose acetate.

The present invention relates to the manufacture of new cellulose derivatives which, in addition to having improved solubility properties, tend to withstand heat to a greater extent than does the known acetone-soluble cellulose acetate. The new cellulose derivatives are characterized by containing both hydroxyalkyl ether groups and ester groups, and particularly the ester groups of the fatty acids, for example acetic acid, propionic acid, butyric acid, lauric acid, oleic acid, stearic acid and the like. Cellulose derivatives containing benzoyl groups and hydroxyalkyl groups are also of value. Particularly important cellulose derivatives are those which contain acetate radicles and hydroxyethyl or like hydroxyalkyl radicles, and especially those containing the said radicles and a comparatively small proportion of higher fatty acid radicles, such as lauric, oleic, stearic and palmitic acid radicles.

The new cellulose derivatives may be produced by the hydroxyalkylation of existing cellulose esters. It is already known to esterify hydroxyalkyl ethers of cellulose, but as will be realized this does not result in compounds of the type contemplated by the present invention, since the esterification results in esterification of the hydroxy group in the ether radicle in addition to any remaining hydroxy groups in the cellulose. According to the present invention it is essential that the hydroxyalkyl group shall remain unesterified in the final product. The most convenient method for carrying the present invention into effect consists in treating a cellulose ester, for example a cellulose acetate, or a cellulose acetate stearate or a cellulose acetate laurate, with a hydroxyalkylating agent under such conditions that substantial elimination of the ester groups is avoided. This may be achieved by treatment with an alkylene oxide etherifying agent, for example ethylene oxide, propylene oxide, butylene oxide, epichlorhydrin, glycide and glycidic acid, without a basic substance or in conjunction with basic substances which do not result in saponification or substantial saponification of the cellulose ester. In starting with a cellulose ester which contains substantially three ester groups per $C_6H_{10}O_5$ molecule, it is permissible in accordance with the present invention to obtain a fair amount of saponification of the ester groups. For example one may go down to as low a proportion as somewhat under two ester groups per $C_6H_{10}O_5$, the hydroxyalkyl groups making up the remainder of the tri-substitution product or part only of the remainder. The starting material for the hydroxyalkylation process may likewise be a cellulose acetate, or a mixed cellulose acetate containing higher ester groups, in which the total ester content amounts for example to 2–2½ groups per $C_6H_{10}O_5$. Such a cellulose ester may be hydroxyalkylated completely without saponification of the ester groups or with a relatively low saponification thereof.

As already indicated the new cellulose derivatives tend to have a higher heat test than the existing acetone-soluble cellulose acetates. In addition it is possible to obtain a product in which all three of the hydroxy groups of the cellulose molecule are substituted and which at the same time is soluble in acetone. This is true, for example, of a product which contains about 2½ acetate groups and about ½ hydroxyethyl group on the $C_6H_{10}O_5$ formula. Similarly a product which contains about 2 acetyl groups and about 1 hydroxyethyl group is soluble in relatively dilute acetone and is therefore of considerable importance from the point of view of the preparation of cheap spinning solutions or dopes containing considerable proportions of water.

The esters or mixed esters which may be used as starting materials for the hydroxyalkylation of the present invention may be prepared by any suitable methods. Acetylation may for instance be conducted with the aid of acetic anhydride in the presence of any suitable catalyst, for example sulphuric acid, phosphoric acid or mixtures of the two, zinc chloride, and hydrochloric acid, ferric chloride, ferric chloride and hydrochloric acid etc. It is convenient in the case of making mixed esters, such as cellulose acetate-stearate to introduce the two acid radicles simultaneously. This may be achieved for instance by treatment of cellulose with stearic anhydride together with acetic anhydride or with stearic acid together with acetic anhydride or with stearic and acetic acids together with chloracetic anhydride.

The hydroxyalkylation of the present invention may be effected with any suitable etherifying agents containing hydroxy groups or groups which lead to the production of hydroxy ethers of cellulose, for example ethylene chlorhydrin, monochlorhydrin or di-chlorhydrin, or other chlorhydrins or halohydrins, or alkylene oxides, for instance ethylene oxide, propylene oxide, butylene oxide, epichlorhydrin, glycide, or glycidic acid.

The reaction may be effected in the liquid or gaseous phase and with or without inert gaseous or liquid media, for instance media which dissolve the starting material and/or the product or media which are non-solvents for such products. The reactions with alkylene oxides are preferably conducted under pressure, for instance pressures of the order of 5, 10 or 20 atmospheres or more, and at comparatively elevated temperatures, for example 80 to 120° C. or 150° C. The pressure may be due solely to the alkylene oxide itself, or to the presence of other inert gaseous media, e. g. nitrogen or carbon dioxide.

As previously indicated it is important that any basic substance which is present during the etherification should not be sufficiently strong to eliminate all the ester groups existing in the cellulose molecule. For this reason relatively weak bases may be used. Suitable bases are for example ammonia, methylamine, dimethylamine, ethylamine, diethylamine, amylamine, hexylamine, dihexylamine, the amines obtainable by chlorination of paraffin hydrocarbons followed by amidation with ammonia or alkylamines and similar products obtainable from higher fatty acids, hydroxy aliphatic amines, aniline, benzylamine and their homologues and substitution products e. g. methylaniline, dibenzylamine, and piperidine. The proportion of base employed will depend to some extent upon whether any saponification of ester groups, if present, is desirable or permissible, but in general proportions of 100%—50%, and preferably 30%—20% or 10%, or even less, calculated on the weight of the cellulosic starting material, may be employed.

The reaction however may be, and preferably is, effected in the absence of bases, particularly when alkylene oxides are used as hydroxyalkylating agents.

The new cellulose derivatives may be used for any purpose to which cellulose esters or ethers have in the past been applied, for example to the manufacture of artificial silk by wet or dry spinning methods, ribbons, films, lacquers, dopes, varnishes, plastics, moulding powders etc. By reason of their special solubility properties they are particularly suitable for the manufacture of artificial filaments and also for lacquer purposes.

The following examples are given by way of illustration only and are not to be considered as limiting the invention in any way.

*Example 1*

100 parts of cellulose acetate containing 2 to 2½ ester groups per $C_6H_{10}O_5$ unit are heated with 75 parts of ethylene oxide in an autoclave at 80°–100° C. for several hours. When the reaction is completed the volatile substances are removed by reducing the pressure and the reaction product is washed and dried.

*Example 2*

100 parts of a cellulose acetate stearate containing about 1½–2 acetate radicles and a small proportion of stearate radicles per $C_6H_{10}O_5$ unit are placed in an autoclave, and butylene oxide is introduced under pressure until it is no longer absorbed by the materials, the temperature being maintained at 80°–100° C. The product of the reaction is then removed, carefully washed and dried.

*Example 3*

100 parts of a cellulose benzoate containing 1½–2 ester groups per $C_6H_{10}O_5$ unit are placed in an autoclave with 20 parts of hydroxypropylmethylamine (prepared by condensing methylamine with propylene oxide) and an excess of propylene oxide. The temperature is raised to 120° C. and maintained there for several hours, after which the volatile substances are removed by reducing the pressure. The hydroxypropyl cellulose benzoate produced is then separated, washed and dried.

What I claim and desire to secure by Letters Patent is:—

1. Process for the manufacture of hydroxyalkyl fatty acid esters of cellulose which comprises reacting upon a partial fatty acid ester of cellulose with an alkylene oxide, said cellulose ester and alkylene oxide being the sole reactants in the reaction mixture.

2. Process for the manufacture of hydroxyalkyl cellulose esters, which comprises reacting upon a partial fatty acid ester of cellulose containing at least two acidyl groups per $C_6H_{10}O_5$ unit, with an alkylene oxide, said cellulose ester and alkylene oxide being the sole reactants in the reaction mixture.

3. Process for the manufacture of hydroxyethyl cellulose acetate, which comprises reacting upon a partial acetate of cellulose containing at least two acetyl groups per $C_6H_{10}O_5$ unit, with ethylene oxide, said cellulose acetate and ethylene oxide being the sole reactants in the reaction mixture.

4. Process for the manufacture of hydroxyethyl cellulose acetate, which comprises reacting upon a partial acetate of cellulose with ethylene oxide, said cellulose acetate and ethylene oxide being the sole reactants in the reaction mixture.

5. Process for the manufacture of hydroxyalkyl cellulose esters, which comprises reacting upon a partial fatty acid ester of cellulose containing at least two different fatty acid radicles with an alkylene oxide, said cellulose ester and alkylene oxide being the sole reactants in the reaction mixture.

6. Process for the manufacture of hydroxyalkyl cellulose esters, which comprises reacting upon a partial stearate-acetate of cellulose with an alkylene oxide, said cellulose stearate-acetate and alkylene oxide being the sole reactants in the reaction mixture.

7. Cellulose derivatives produced by the process of claim 1, containing hydroxyalkyl radicles and fatty acid radicles in which the hydroxyalkyl radicles are unesterified, said cellulose derivatives having an increased resistance to heat and being acetone-soluble.

8. Hydroxyethyl cellulose acetates, produced by the process of claim 4, in which the hydroxyethyl radicle is unesterified, said hydroxyethyl cellulose acetate having an increased resistance to heat and being acetone-soluble.

9. Hydroxyalkyl cellulose stearate-acetate, produced by the process of claim 6, in which the hydroxyalkyl radicles are unesterified, said hydroxyalkyl cellulose stearate-acetate having an increased resistance to heat and being acetone-soluble.

HENRY DREYFUS.